United States Patent [19]

Moore, Jr.

[11] 3,860,476
[45] Jan. 14, 1975

[54] METHOD OF FORMING REFRACTORY LAMINATES

[75] Inventor: Earl P. Moore, Jr., Wilmington, Del.

[73] Assignee: E. I. Du Pont de Nemours and Company, Wilmington, Del.

[22] Filed: May 7, 1973

[21] Appl. No.: 357,523

Related U.S. Application Data

[60] Division of Ser. No. 148,959, June 1, 1971, Pat. No. 3,767,458, which is a continuation-in-part of Ser. No. 49,915, June 25, 1970, abandoned.

[52] U.S. Cl............... 156/297, 106/38.3, 106/38.9, 106/38.27, 106/38.35, 117/5.1, 117/70, 117/169, 156/310, 161/182, 161/206, 164/26, 164/41
[51] Int. Cl............................................. B32b 31/00
[58] Field of Search...... 117/5.1, 70 R, 70 S, 100 B, 117/100 S, 169 R; 164/26, 34, 41; 161/182, 206; 106/38.27, 38.35, 38.9, 38.3; 156/297, 310

[56] References Cited
UNITED STATES PATENTS

| | | | |
|---|---|---|---|
| 3,226,784 | 1/1966 | Owen et al.................. | 117/123 B X |
| 3,270,382 | 9/1966 | Emblem et al............... | 106/38.35 X |
| 3,292,220 | 12/1966 | Emblem et al............... | 106/38.35 X |
| 3,428,465 | 2/1969 | McLeod....................... | 106/38.35 X |
| 3,745,126 | 7/1973 | Moore, Jr.................... | 117/100 S X |
| 3,748,157 | 7/1973 | Moore, Jr..................... | 164/26 X |
| 3,751,276 | 8/1973 | Beyer et al.................. | 164/26 X |
| 3,754,945 | 8/1973 | Moore, Jr..................... | 164/26 X |
| 3,754,946 | 8/1973 | Moore, Jr..................... | 164/26 X |

*Primary Examiner*—William D. Martin
*Assistant Examiner*—Dennis C. Konopacki

[57] ABSTRACT

A rapid process for forming a refractory laminate on the surface of a support structure which comprises dipping the structure in a bath comprising a sol of negatively charged colloidal particles of an inorganic substance and/or a solution of an alkaline ionic silicate to form a layer on the surface, contacting the layer on the surface with refractory stucco grains containing a setting agent to firmly set the colloidal silica or silicate and the stucco grains. This procedure is repeated until a laminate of the desired thickness is built up on the surface. Interaction between the negatively charged colloidal particles or silicate and the stucco grain-setting agent mixture results in the polymerization of the silica or silicate and thereby the immobilization of the coatings. This technique makes it possible to successively apply and set coatings to build refractory laminates in very short times without intermediate drying and without sloughing of coats. The process is particularly suited for making expendable, refractory shell molds for precision investment casting of metals by the so-called "lost-wax" technique.

10 Claims, No Drawings

METHOD OF FORMING REFRACTORY LAMINATES

REFERENCE TO RELATED APPLICATION

This is a division of application Ser. No. 148,959 filed June 1, 1971, now U.S. Pat. No. 3,767,458 which is a continuation-in-part of application Serial No. 49,915, filed June 25, 1970, now abandoned.

BACKGROUND OF THE INVENTION

This invention relates to the process for forming refractory laminates. The process is useful for a variety of purposes but it was developed for and is particularly suited to the manufacture of expendable, refractory shell molds for precision investment casting of metals by the "lost-wax" or disposable pattern technique.

Refractory shell molds for precision investment casting are usually prepared by dipping a disposable pattern, which is a replica of the part to be cast, into a refractory slurry consisting of a suspension of fine refractory grain in a bonding liquid. The disposable pattern is usually wax or plastic and is solvent cleaned prior to dipping into the slurry. Other disposable materials such as low-melting tin-bismuth alloy and frozen mercury are sometimes employed for the pattern. The binder is generally capable of hardening during drying at room temperature. After dipping, the excess slurry is drained from the coated pattern and while the coating is still wet it is stuccoed with coarser refractory particles. The stuccoing is carried out by dipping the coated pattern into a fluidized bed of the refractory particles or by sprinkling the particles onto the pattern. The process of dipping and stuccoing is repeated until a refractory shell having sufficient thickness to resist stresses incurred in subsequent casting operations is built up around the pattern. The usual thickness of the shell is from one-eighth to one-half inch, although thinner or thicker shells may be produced. The completed pattern is usually dried under ambient conditions for 24 hours. The disposable pattern is then usually removed from the ceramic shell mold by flash dewaxing furnaces, steam autoclaves, or boiling solvent baths. The refractory shell mold is then fired at 1700°–1900°F. to prepare it for metal casting.

In this conventional manner of making refractory shell molds the period of drying between coating applications may vary from 30 minutes to 4 hours depending on temperature, humidity, air flow and complexity of the pattern. This greatly increases the time and cost involved in making the molds. The drying problem is particularly difficult in recessed areas or "blind" cores (hollow openings, closed at one end). These ceramic molds may dry only after many hours, since much of their surface area is not suitably disposed to drying by the atmosphere. Drying is necessary to harden the slurry coatings and to insure that subsequent coats will adhere to previous ones without sloughing away.

Another shortcoming of the conventional method of making shell molds is that when the slurry is dried microfractures often occur on hardening. When the next slurry coating is applied the binder in the slurry may flow through the stucco and either dissolve the slurry coating in part or cause it to flake.

Because of these shortcomings of the conventional mold forming processes, efforts have been made to develop chemical methods for rapid setting of the binder coatings, in order to eliminate the requirement of drying between dips and reduce the time interval between dips to a few minutes. One approach has been to use a gaseous reactant in order to set the binder. U.S. Pat. No. 2,829,060 discloses the use of carbon dioxide to set sodium silicate-bonded shells containing ammonia. U.S. Pat. No. 3,455,368 discloses the use of ammonia gas to set hydrolyzed ethyl silicate or acidified aqueous colloidal silica-bonded shells. U.S. Pat. No. 3,396,775 discloses the use of volatile organic bases in order to set shells bonded with hydrolyzed ethyl silicates. Volatile solvents and gaseous ammonia present ventilation problems to the foundry. These problems have contributed to the slow acceptance of these fast-setting systems.

Another approach has been to use an acidified aqueous colloidal silica to gel a basic colloidal silica and vice versa. In this approach both binders are negatively charged and gelation occurs because of pH changes. This system is described in a paper by Shipstone, Rothwell and Perry, "Drying Ceramic-Shell Moulds", British Investment Casters' Technical Association, 9th Annual Conference. However, systems based on gelling due to pH changes have not found wide spread acceptance because gelation is slow and the resulting wet gels are weak. This gives rise to sloughing-off of the early coats during subsequent dipping.

A third rapid setting approach in the art employs sodium silicate as the binder and mono-ammonium phosphate and magnesium oxide are in the stucco as a gelling agent. This is described in an article by Dootz, Craig, and Peyton, "Simplification of the Chrome-Cobalt Partial Denture Casting Procedure", J. Prosthetic Dentistry, Vol. 17, No. 5, pages 464–471, May 1967.

A fourth approach employs an ethyl silicate dip coat which is set with aqueous colloidal silica containing ammonia. This is disclosed in an article by Shepherd, "Adaptation of the Ceramic Shell Mould to Meet Mass Production Requirements," British Investment Casters' Technical Association.

A fifth approach has been to add a volatile, organic solvent to the silica sol. Relatively rapid gelling is obtained by allowing the solvent (usually an alcohol) to evaporate. For a simple casting the time required for evaporation may be only several minutes, but for a complex casting evaporation may require several hours, since diffusion of solvent from deeply recessed areas or blind core areas is slow.

SUMMARY OF THE INVENTION

This invention is a rapid process for forming a refractory laminate on the surface of a support structure. The process comprises:

a. dipping the structure in a bath comprising at least one member of the group consisting of a sol of negatively charged colloidal particles of an inorganic substance and a solution of an alkaline ionic silicate to form a negatively charged layer on the surface, b. contacting the layer on the surface with a refractory stucco grain containing a setting agent to firmly set the negative colloid or silicate, the setting agent being a monofunctional or polyfunctional cationic organic compound, positively charged colloidal particles or a basic aluminum salt having the formula $$Al_x(OH)_yA_z$$

wherein $x = 1 - 8$, $y = 1 - 20$, $z = 1 - 4$ and A is an acid anion.

Steps (a) and (b) are repeated in sequence as required to build a refractory laminate of the desired thickness.

Preferably, in step (b), the coated surface is dipped into a fluidized bed of the setting agent-refractory stucco grain mixture although other means of contacting the coated surface with the setting agent can be used, as hereinafter described. In order to increase the rate of laminate build-up, the bath of step (a) can, and preferably does, comprise a slurry of a particulate refractory grain (metal or inorganic compound) in the negative sol or silicate solution.

As mentioned previously, the process of this invention is particularly suited to the manufacture of expendable, refractory shell molds for precision investment casting of metals. In this application of the process, a disposable pattern of the metal casting is dipped into a bath comprising a sol of negatively charged colloidal particles of an inorganic substance and/or a solution of an alkaline ionic silicate to form a layer on the pattern. Thereafter, the layer on the pattern is contacted with a refractory stucco grain coated or mixed with a setting agent to set the negative colloid or silicate. These steps are repeated in sequence as required to build a shell mold of the desired thickness. Preferably, in order to increase the rate of build-up of the ceramic shell mold, the bath of negative sol and/or silicate comprises a slurry of relatively fine refractory grain. In the most preferred embodiment two slurries of refractory grain in silica sol and/or silicate solution are used. The first bath contains relatively fine refractory grain and is used for the first or prime coat. The second contains relatively coarse refractory grain and is used for subsequent coats (back-up or follow-up coats).

This invention also includes refractory laminiates and refractory laminate articles, such as shell molds, made by the above-described process. The laminates comprise superposed layers of a gel of at least one member of the group consisting of negatively charged colloidal particles of an inorganic substance and an alkaline ionic silicate, the gel containing a basic aluminum salt, positively charged colloidal particles or a cationic organic compound. The process of this invention is rapid because it is not necessary to dry between coats. This is particularly significant in the manufacture of refractory shell molds by the process of the invention. As soon as one coat of silica or silicate sol has been applied the coated pattern can be contacted with stucco grains mixed or coated with a setting agent. When the setting agent is a monofunctional organic nitrogen-containing cationic compound, coagulation of the silica or silicate layer occurs, due to chemical and electrical charge forces between the negatively charged silica or silicate and the positively charged organic cationic compound. The setting agent can also be a polyfunctional cationic organic compound.

Polycationic compound-setting agents interact with a negatively charged colloidal silica or silicate with the resultant aggregation of silica or silicate particles and setting agent-silica or setting agent-silicate particles and consequently the immobilization of the coatings. The integrity of the wet coatings depends upon the firmness of the aggregated material as well as the physical properties of the polycationic compound itself (e.g., toughness). If the setting agent used is a basic aluminum salt there is a strong interaction between the negatively charged silica or silicate and positively charged basic aluminum salt, combined with further polymerization of the aluminum salt by base in the silica-silicate systems, producing rapid aggregation of particles and a stiff gel structure and coating immobilization. Similarly, interaction of positively charged colloidal particles with the negatively charged silica of the sol, results in destabilization of the sol and gelation. Generally, it is necessary to allow 1 to 5 min. for a chemical compound to immobilize a coating after stuccoing before a pattern can be redipped. The time depends upon the solubility of the compound in the coating mixture and its level of activity - the faster a chemical dissolves and the more active it is the shorter the time to set a coating.

DESCRIPTION OF THE INVENTION

The invention will now be described in detail with particular reference to its use in forming expendable, refractory shell molds for precision investment casting of metals.

Negative Sols

Among the negative sols which can be used in this invention are silica sols composed of substantially discrete, dense, non-agglomerated particles of silica dispersed in a suitable liquid medium. The concentration of silica in these sols can be as low as 5% and as high as 60% by weight. However, it is preferred that the silica content be at least 25% by weight. For the purposes of this invention, it is most preferred that the silica concentration be between 25 and 40% by weight.

The average diameter of the silica particles should be between about 1 and 150 millimicrons. It is preferred that the average silica particle diameter be in the range of 5-50 millimicrons and most preferred that it lie between 5 and 16 millimicrons.

The pH of the silica sol may range from 10.5 down to 7.5 or even lower with satisfactory results. The pH which is preferred is between 8.5 and 10, as in the commercial "Ludox" colloidal silica sols. It is not necessary, however, that the silica sol be basic, since the setting action in the process of this invention does not depend upon pH change, but upon interaction between oppositely-charged materials. In an acid silica sol, as well as in a basic silica sol, the silica particles are negatively charged.

Positively charged stabilizing counter ions for the colloidal silica particles in the sols are $Na^+$, as in "Ludox" LS, HS, SM and AM, $NH_4^+$, as in "Ludox" AS, $K^+$, $Li^+$ and quaternary ammonium. Silica sols whose particle surfaces have been modified with metal oxides to enhance negative character, such as "Ludox" AM with aluminate-modified silica, are useful.

Other negative sols can be used in place of silica sols. Examples include sols of naturally occurring clays of the bentonite, attapulgite, and kaolinite types.

The liquid medium for suspending the colloidal particles can be water, alone or mixed with low molecular weight water-miscible alcohols such as methanol and isopropanol or other polar organic liquids, or it can be one or more of these organic liquids free of water. The preferred medium for this invention is water.

Alkaline Ionic Silicates

Various types of basic silicates have been found suitable for the process of this invention. Thus, alkali metal silicates as aqueous solutions can be used. Useful concentrations of silicate solids expressed as $SiO_2$, can vary from 1–50% or higher, with only the restriction imposed by excessive viscosity limiting utility. For the purposes of this invention the preferred concentration of $SiO_2$ is 5–30%.

The alkali metal silicates which are useful include the sodium, potassium and lithium silicates. In the case of the sodium and potassium silicates, $SiO_2:Na_2O$ and $SiO_2:K_2O$, molar ratios can be 2:1 or lower, up to 4:1 or higher; the preferred ratios are between 2.5:1 and 3.5:1. In the case of the lithium silicates the $SiO_2:Li_2O$ ratio can be 3.5:1 or less up to very high values such that the size of the molecules are well into the colloidal range.

In addition to alkali metal silicates, quaternary ammonium silicates can be used. Mixtures of alkaline ionic silicates and colloidal silicas can also be used.

Setting Agents

In the preferred process of this invention a disposable pattern is first dipped into a bath comprising a sol of negatively charged colloidal particles and/or a solution of an alkaline ionic silicate, as just described, and then treated with a setting agent which is coated on a refractory stucco grain. The refractory grain can be coated in several different ways. This may be done by applying a solution, dispersion or emulsion of agent to a grain surface then evaporating the solvent. Also, a reagent can be precipitated on a grain surface; for example, a water soluble salt of a normally insoluble polymer can be coated on a grain and then base can be added to precipitate the polymer on the grain. Thirdly, a grain can be coated with a reagent by applying finely divided solid agent to a moist grain surface and drying the composition.

The solid active setting agent may also be mixed with the refractory grain and the mixture employed as stucco. To obviate separation of the agent and grain it is preferable that the solid agent be sieved to a particle size range approximately that of the grain. Finer or coarser agent can, of course, be used. Simple mechanical mixing is used to prepare the active stuccoing composition.

The percentage of chemical agent which can be used in this invention can be as low as 1% or as high as 30%, or even higher (based on grain weight); preferably, the percentage of agent is 3 to 15%.

The setting agents useful in this process may be monofunctional cationic nitrogen-containing organic compounds, polyfunctional cationic organic monomers and polymers and positively charged colloidal particles or basic aluminum salts. The aluminum salts are the preferred setting agents in this process.

Monofunctional Cationic Nitrogen-Containing Organic Compounds

Suitable setting agents include long-chain amines and their organic and inorganic acid salts and substituted onium salts of organic and inorganic acids.

Representative of onium compounds are substituted ammonium, imonium, hydroxylammonium, diazonium, hydrazonium and guanadonium compounds. The substituents in the amines, amine salts and onium salts are hydrogen, straight or branched-chain aliphatic groups of 1 to 25 carbon atoms, cycloalkyl, aryl, and alkyl substituted aryl groups. The nitrogen can be part of the ring in a heterocyclic structure and there must always be present at least one and no more than two alkyl chains of 6 or more carbon atoms. The aliphatic substituents can, of course, be saturated or unsaturated and the longer chain substituents, containing 18 or more carbon atoms, preferably contain at least one double bond.

Suitable onium or amine or amine salt reagents can be prepared by methods well known in the art and many are commercially available.

Representative of suitable commercially available onium reagents are the following: Aliquat 7, 11, 204 and 215; Amine C; Ammonyx DME and T; Arquad 12-50, 16-50, 18-50, L-15 and 2C-50; Atlas G-263; Barquat OE-50, LPC and IB-75; Bretol; Bromat; BTC 1750; Dynafac; Fixanol VR; Intexsan HB-50; Isothan Q-75; Monaquat OIBC; Monazoline M; Quatrene CB, 0-56 and SFB; Romine BTQ; SD-75; Triton X-400 and Vantoc CL.

Representative of other suitable onium coactants are the following: n-octyltrimethylammonium chloride, dodecyldimethylethylammonium bromide, tetradecyldiethylbenzylammonium ethosulfate, dicocodimethylammonium acetate, dodecylbenzyltrimethylammonium chloride and N-eicosylpyridinium bromide.

Preferred onium reagents are those in which there is an alkyl chain of between 8 and 20 carbon atoms and which contain a total of between 11 and 50 carbon atoms. Representative of preferred onium setting agents are octadecyltrimethylammonium chloride, dodecyltrimethylammonium bromide, 2-pentadecyltrimethylammonium halides, hexadecyltrimethylammonium chloride, didodecyldimethylammonium acetate, lower alkyl substituted imidazolines of tetradecanoic acid, dodecylbenzyltrimethylammonium chloride, cetylpyridinium chloride, oleyl and linoleyltrimethylammonium halides, cetyltrimethylammonium halides, and the quaternary derivatives of alkyl substituted imidazolines of dodecanoic acid.

Representative of suitable commercially available amine reagents are Adogen 101-D, 140 and 160-D; Alamine 4, 5 and 6; Armeen O, L-11 and DM-12-D; Barlene 8, 14 and 16; Diam 21; Formonyte D-801; and Hodag Amine C-100-S. Other suitable amine setting agents include primary amines such as n-octylamine and 4-hexylcyclohexylamine; secondary amines such as di-n-decylamine and ethyltetradecylamine; and tertiary amines such as p-hexadecyl-N, N-dimethylaniline.

Preferred amine reagents are those in which there is an alkyl chain of between 8 and 20 carbon atoms and which contain between 8 and 40 carbon atoms in total. Representative of preferred amine coactants are dodecylamine, ethyloctylamine and dimethyldecylamine.

Amine salt reagents suitable to this invention are salts of any of the above-defined and exemplified primary, secondary and tertiary amines. Acids suitable for salt formation with these amines are: inorganic acids such as HCl, HBr, HI, $NH_2SO_3H$, $H_2SO_4$ and $H_3PO_4$; organic acids such as formic, acetic, hydroxyacetic, citric, oxalic and partially esterified $H_2SO_4$ and $H_3PO_4$. No restriction to only these acids for this invention is intended. Any inorganic or organic acid which will react with an amine or amines above-defined and exemplified to produce a positively charged nitrogenous salt will suffice.

Preferred amine salts are those formed from the preferred amine reagents and HCl, H₂SO₄, H₃PO₄ and acetic acid. Representative of preferred amine salts are dodecylamine hydrochloride, dioctylamine hydrosulfate, ethyloctylamine dihydrogen phosphate and dimethyldecylamine acetate.

Polycationic Organic Polymers and Monomers

The cationic polymers and monomers useful in this invention are those containing a plurality of positively charged nitrogen-containing groups, such groups being attached directly to carbon atoms in the polymer structure.

Representative of positively charged nitrogen-containing groups which can be present as part of the polymer structure in this invention, are primary, secondary and tertiary amino, hydroxylamino and substituted hydroxylamino, hydrazino and substituted hydrazino, oximino; positive groups formed by salt formation of the above groups and organic and inorganic acids; substituted onium groups such as ammonium, imonium, hydroxylammonium and hydrazonium.

The preferred groups in polymers and monomers of this invention are primary, secondary and tertiary amino, products of their reaction with acids, and quaternary ammonium. These groups can be parts of the monomeric structure or the polymer chain, that is, the nitrogen atoms can be present in the backbone in place of carbon or other atoms. The groups can be laterally attached to carbon atoms of the principal monomer structure or polymer chain or to carbon or other atoms which are attached to the polymer chain. The nitrogen atom of a group can be part of a heterocyclic ring.

Substituents for hydrogen on the nitrogen atoms of an amine, amine salt or ammonium salt can be straight or branched-chain aliphatic or aryl groups of 1 to 6 carbon atoms. By substituents is meant herein carbon content which is not part of the principal polymer backbone. Aliphatic substituents can be saturated or unsaturated.

Suitable polymers with amino, amino salt and onium salt groups can be prepared by methods well known in the art or can be obtained commercially.

Representative of suitable commercially available cationic polymers are the following: the "Cato" starches (National Starch Products); the "Reten" resins (Hercules Chemical Co.); the "Catalin" resins (Catalin Corp.); the "PEI" polyethylenimine polymers (Dow Chemical Co.).

Representative of suitable cationic polymers which can be prepared according to teachings in the art are: polymers obtained by reacting polybasic amines (e.g., tetraethylenepentamine, diethylenetriamine) with various resins such as urea-formaldehyde, polyurethane, polyester, epoxy, etc.; polymers obtained by the homopolymerization of unsaturated amines such as 2-dimethylaminoethyl methacrylate, 4-vinyl pyridine and diallylamine and the copolymerization of these amines with suitable monomers such as vinyl acetate, methyl vinyl ether, methyl methacrylate, ethyl acrylate, acrylonitrile, methacrylonitrile, styrene, α-methylstyrene, ethylene, propylene, butylene, vinyl chloride, vinylidene chloride, isoprene, chloroprene, butadiene, methyl vinyl ketone, dimethyl fumarate, acrylamide and methacrylamide.

It is, of course, possible to polymerize or copolymerize salts of the unsaturated amine compounds. Examples of acids useful in preparing these salts are inorganic acids such as HCl, HBr, HI, H₂SO₄, H₃PO₄, NH₂SO₃H and organic acids such as formic, acetic, hydroxyacetic, and so forth. Alternatively, salts can be prepared by combining polymers and the above acids.

Quaternary ammonium groups can be introduced into polymers by treating polymers containing primary, secondary or tertiary amino groups with organic alkylation compounds according to procedures well known in the chemical art. Also, polymers containing quaternary ammonium groups can be prepared by homopolymerizing unsaturated quaternary ammonium salts such as the alkylated derivatives of the unsaturated amines cited above or by copolymerizing these salts and suitable monomers such as the ones listed above.

Suitable non-polymeric amine, amine salt and onium salt reagents can be prepared by methods well known in the art and many are commercially available.

Representative of suitable non-polymeric amines for this invention are:
ethylenediamine (H₂N — CH₂CH₂ — NH₂)
diethylenetriamine (H₂N — CH₂CH₂ — NH — CH₂ — CH₂ — NH₂)
N-(hydroxypropyl) m-phenylenediamine
N,N,N′N′-tetramethyl-2-butene-1,4-diamine
triethylenetetramine

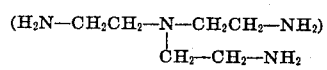

3-amino-N-ethylpiperidine
H(-CH₂-CH₂-NH-)₁₀H
2,5-diaminopyridine

Amine salts useful in this invention are salts of any of the polyamino compounds defined and represented above. Acids suitable for salt formation with these amines are: inorganic acids such as HCl, HBr, HI, NH₂SO₃H, H₂SO₄ and H₃PO₄; organic acids such as formic, acetic, hydroxyacetic, citric and oxalic. Actually, any inorganic or organic acid of sufficient strength to react with an amine to produce a positively charged nitrogenous salt will suffice. Preferred acids for this invention are HCl, H₂SO₄, H₃PO₄ and acetic acid.

The polycationic organic monomers and polymers of this invention have from 1 to 24 carbon atoms per cationic functional group and more preferably, 1 to 10 carbon atoms per functional group.

Positively Charged Colloidal Particles

The positively charged colloidal particles useful as setting agents in this invention form stable positively charged sols. Refractory grains slurried in a positive sol and then dried become coated with the setting agent-positively charged colloidal particles. The preferred positive sols for use in this invention are those in which the positively charged colloidal particles are composed of a silica core coated with a polyvalent metal-oxygen compound. Sols of this type are described in U.S. Pat. No. 3,007,878. As indicated in this patent, the polyvalent metal-oxygen compound which can be used to provide a positive surface charge on colloidal silica particles can be any compound of the class of metal oxides, metal hydroxides and hydrated metal oxides of trivalent aluminum, chromium, gallium, indium, and thallium or tetravalent titanium, germanium, zirconium, tin, cerium, hafnium and thorium. For purposes of economics it is preferred that the positive sol be an aqueous dispersion of alumina-coated colloidal silica particles of the type illustrated in FIG. 1 of U.S. Pat. No. 3,007,878.

An example of a charged alumina-coated silica sol which is particularly useful in this invention is one in which there is 1 mole of aluminum per mole of surface silica and which is prepared by a process described in Example 2 of co-pending commonly assigned application Ser. No. 831,748 as follows:

264 lbs. of "Ludox" HS colloidal silica containing 40% $SiO_2$ by weight, the silica particles having an average particle size of 12-15 millimicrons and a specific surface area of about 215 $m^2/g$. $SiO_2$, is adjusted to pH 7.50 with 821 grams of a 1:1 mixture of a concentrated hydrochloric acid in water. The sol is mixed with 62.8 lbs. of 50% chlorohydrol ($Al_2(OH)_5Cl$) and 61.7 lbs. of water by introducing it at a rate of 25 lbs./minute into a centrifugal pump circulating the basic aluminum chloride solution. The clear fluid intermediate product is heated to 60°C. in one-half hour and at 60° C. for 2 hours, cooled to 20°C., and stirred with a Lightnin mixer as well as circulated with the pump as 600 grams magnesium hydroxide dispersed in 1800 grams water is introduced in 5 minutes to bring the pH to 5.65. Agitation and circulation are continued for 2 hours. The clear stable product contains 26.4% $SiO_2$, 4.2% $Al_2O_3$, 1.0% Cl and 0.23% MgO. The mole ratio of aluminum to surface $SiO_2$ is 1:1. The pH of the product after several weeks aging is 4.60, the viscosity is 15 cps, and the specific gravity at 25°C. is 1.23.

The medium for the positive sol need not be water. Low molecular weight alcohols or other polar organic liquids can be present in part or can entirely replace water.

The positive sol described above is stabilized by chloride ion. As described in U.S. Pat. No. 3,007,878 other anions, such as formate, acetate, lactate, nitrate, bromide, perchlorate, bromate, and trichloroacetate, can be used instead of chloride.

Other positive sols can be used in this invention in place of the sol composed of colloidal silica particles coated with polyvalent metal-oxygen compounds. In particular, sols prepared from a number of commercially available dispersible colloidal aluminas such as "Dispal" (Continental Oil Co.), "Alon G" (Cabot Corp.), and "Super-Ox" (Merkal Research Co.), can be used.

Basic Aluminum Salts

The basic aluminum compounds suitable for use in this invention can be represented by the chemical formula $$Al_x(OH)_yA_z$$

where x, y and z are positive integers, x = 1 - 8, y = 1 - 20 and z = 1 - 4; A is an acid anion such as chloride, nitrate, sulfate, phosphate, formate, acetate and so on.

Representative of suitable basic aluminum compounds are basic aluminum chloride, $$Al_2(OH)_5Cl$$

basic aluminum formate, $$Al(OH)(O_2CH)_2$$

basic aluminum acetate, $$Al(OH)_2\ O_2C-CH_3$$

basic aluminum sulfamate, $$Al_3(OH)_7(O_3S-NH_2)_2$$

basic aluminum nitrate, basic aluminum hydroxyacetate, basic aluminum sulfate, etc.

These compounds can be prepared by ion exchanging or electrolyzing the corresponding aluminum salts, or by dissolving aluminum metal in the appropriate aluminum salt or acid solution, or by partially neutralizing the corresponding aluminum salt with a base.

Preferred basic aluminum salts are those with $x = 1 - 2$, $y = 1 - 5$ and $z = 1 - 2$; examples of preferred basic aluminum salts are:

basic aluminum chloride, $Al_2(OH)_5Cl$, also known as aluminum chlorhydroxide and "Chlorhydrol" (Reheis);
  basic aluminum acetate, $Al(OH)_2\ O_2C-CH_3$ ⅓ $H_3BO_3$, sold commercially as "Niaproof" (Union Carbide); the $H_3BO_3$ is present as a stabilizing agent.

Refractory Grain

In building shell molds in accordance with this invention, any finely divided refractory material may be used provided it does not react with the colloidal silica or silicate binders or the setting agents. Among suitable refractory materials are zircon, molochite, fused silica, sillimanite, mullite and alumina. To obtain castings with a smooth surface finish, all the refractory grain in the primary or first coating composition should pass a 100 mesh sieve and preferably 85% should pass a 200 mesh sieve. Even finer mesh refractory may be employed for better surface finish and it is preferred in most instances. In subsequent coatings the refractory may be much coarser but it is preferred that all the material pass a 100 mesh sieve. These mesh sieve numbers correspond to the Standard U.S. Sieve Series.

The refractory material used for the stucco is preferably a coarser grade of the same refractory grain used in the slurry composition. For example, if refractory in a prime coat slurry is zircon with approximately 75% passing the 325 mesh sieve, the refractory used for the stucco can also be zircon in the range of −80 to 140 mesh. It is not essential, however, that refractory material of the same composition should be used for both the stucco and the slurry. Examples of refractory materials suitable for stucco are zircon, zirconia, sillimanite, mullite, fused silica, alumina and fire clay grog.

Slurries

In most instances practice of this invention will involve the preparation and use of two slurries, both containing colloidal silica sol and/or silicate solution and refractory grain. One slurry will contain relatively fine refractory grain and will be used for the prime coat. The other will contain a coarser refractory grain and be used for the back-up or follow-up coats. However, it is possible to use the prime coat slurry for back-up or follow-up coats as well. In most instances, less expensive refractories are used for the back-up coats. Molochite, an aluminosilicate, is frequently used as the back-up coat for a zircon prime coat, and a slightly coarser grade of a fused silica powder is used as the back-up coat for a finer fused silica prime coat.

A discussion of the preparation of some specific slurries which are useful in the practice of this invention follows. In these slurries the colloidal silica sol is "Ludox" SM-30, a basic, aqueous silica sol which contains 30% colloidal silica with an average particle size of about 7 m$\mu$.

Zircon

The zircon slurries used in the zircon-molochite slurry system employ a finely ground zircon flour (No. 3 Grade from Casting Supply House). This flour is described as $-325$ mesh, since approximately 75% passes through this screen. This flour is mixed with silica sol to make a prime coat slurry. The resulting coatings are very smooth, dense and inert to molten metals and alloys and possess good thermal stability to 2500°F. and above.

In making the slurry the refractory flour is added to the silica sol and to any additional water, if needed, while mixing. A propeller-type agitator is suitable for this purpose. Slurry equilibrium is usually reached after a few hours of agitation, although high shear mixing of a new batch is not recommended because of overheating. The combination of low slurry viscosity and zircon's high density can cause the grain to settle out unless sufficient agitation is maintained. The best slurry working temperature is 75°-85°F. After mixing is completed, a wetting agent such as Ultrawet 60L (Atlantic Refining Company) may be added to this colloidal silica-zircon slurry to improve flowability, and to improve wettability of the slurry onto the pattern. To minimize foaming when a wetting agent is used the quantity should not exceed 0.05% by weight of the colloidal silica.

The zircon slurries will function over a wide range of the viscosities. The viscosities obtained at 80°F. with a No. 4 Zahn Viscosimeter are in the range of 11-21 seconds and more preferably in the range of 15-17 seconds.

Molochite

The molochite employed in the zircon-molochite slurry systems is a coarser flour than the No. 3 zircon flour. This flour (No. 6. Molochite, from Casting Supply House) is defined as being $-200$ mesh since approximately 75% will pass the 200 mesh screen. No. 6 Molochite is mixed with colloidal silica binder to make slurries for the back-up or follow-up coats.

The silica sol-molochite slurry is made in the same manner as the silica sol-zircon slurries. No wetting agent is required since molochite is only about half as dense as zircon. Only a few hours of mixing are required to attain slurry equilibrium. The best slurry working temperature is in the range of 75°-85°F. At 80°F. viscosity of the silica sol-molochite slurry obtained with a No. 4 Zahn cup should be 7-14 seconds and more preferably 10-11 seconds.

Fused Silica

Two different particle sizes of "Nalcast" fused silica (Nalco Chemical Company) can be used for dip slurries. These are "Nalcast" P1W fused silica flour and "Nalcast" P-2 fused silica flour.

"Nalcast" P1W flour has a wide particle size distribution and is used with colloidal silica sol to prepare thick slurries for the inner or prime shell coats. "Nalcast" P1W is defined as $-200$ mesh since all the grains will pass through a 200 mesh sieve and approximately 75% will pass a 325 mesh sieve.

In making the silica sol-"Nalcast" P1W slurry the silica sol is added along with the calculated amount of water to the mixing container. With good agitation about 85% of the calculated "Nalcast" P1W flour will stir in readily. The last portion is added in small increments. The use of efficient mixing equipment will permit the preparation of a suitable slurry in a few hours. The stirrer should be stopped for periods to allow the entrapped air bubbles to rise to the surface and break. Care should be taken that stirring is not carried out with excessive shear such that the slurry overheats from the friction generated. The best slurry working temperature is 75°-85°F.

After mixing is completed a wetting agent such as Ultrawet 60L may be added to the slurry to improve flowability and wettability of the slurry onto the pattern. To minimize foaming the quantity of wetting agent should not exceed 0.05% by weight of the colloidal silica. This colloidal silica-fused silica slurry will function over a wide range of viscosity, but a suitable viscosity measured with a No. 4 Zahn cup at 80°F. ranges from 25-35 seconds and more preferably 29-31 seconds.

"Nalcast" P-2 flour is a coarser powder than "Nalcast" P1W and is defined as $-100$ mesh since all will pass through a 100 mesh screen and approximately 45% will pass a 325 mesh screen. "Nalcast" P-2 flour is used with the colloidal silica sol binder to make a slurry for forming the back-up or outer shell coats.

The colloidal silica sol-"Nalcast" P-2 slurry is made in the same manner as the corresponding "Nalcast" P1W slurry. However, the "Nalcast" P-2 slurry is easier to mix because "Nalcast" P-2 flour is coarser than "Nalcast" P1W and the slurry is made less viscous. No wetting agent is needed for the slurry. The slurry viscosity as determined on the No. 4 Zahn cup at 80°F. is in the range 12-25 seconds and more preferably in the range 15-18 seconds.

It is of course possible to use the same slurry for both prime and back-up coats. This is illustrated in Example 14, wherein a "Nalcast" P1W slurry is used for both prime and back-up coats.

The broad ranges of composition along with the more preferred ranges of compositions for prime and back-up coats in both the zircon-molochite and "Nalcast" fused silica systems just discussed are given in Tables I and II.

TABLE I

ZIRCON-MOLOCHITE SYSTEM

| Prime Coat Slurry | Composition Broad Range | Parts by Weight Preferred Range |
|---|---|---|
| Zircon Refractory Flour, 325 Mesh | 86-50 | 86-67 |

TABLE I—Continued

ZIRCON-MOLOCHITE SYSTEM

| Prime Coat Slurry | Composition Broad Range | Parts by Weight Preferred Range |
|---|---|---|
| Colloidal Silica Aquasol | 14–50 | 14–33 |
| Ultrawet 60L | 0.05 parts per 100 parts SiO$_2$ Max. | 0.05 parts per 100 parts SiO$_2$ Max. |
| Extra Water | As needed | None |
| pH | 9.6–9.9 | 9.6–9.9 |
| Viscosity, No. 4 Zahn Cup, Sec. | 11–21 | 14–18 |
| Colloidal Particle to Refractory Flour Ratio | 0.05–0.30 | 0.05–0.15 |
| Molochite Refractory Flour, 200 Mesh | 75–50 | 65–50 |
| Colloidal Silica Aquasol | 25–50 | 35–50 |
| Extra Water | As Needed | None |
| pH | 9.8–10.1 | 9.8–10.1 |
| Viscosity, No. 4 Zahn Cup, Sec. | 7–14 | 9–12 |
| Colloidal Particle to Refractory Flour Ratio | 0.10–0.335 | 0.16–0.30 |

TABLE II

"NALCAST" SLURRY SYSTEMS

| Prime Coat Slurry | Composition, Broad Range | Parts by Weight Preferred Range |
|---|---|---|
| "Nalcast" P1W Fused Silica | 75–60 | 75–69 |
| Colloidal Silica Aquasol | 10–40 | 10–31 |
| Ultrawet 60L | 0.05 per 100 parts SiO$_2$ sol (Max.) | 0.05 per 100 parts SiO$_2$ sol (Max.) |
| Extra Water | 15–0.0 | 15–0.0 |
| pH | 9.6–9.9 | 9.6–9.9 |
| Viscosity, No. 4 Zahn Cup, Sec. | 25–35 | 25–32 |
| Colloidal Particle to Refractory Flour Ratio | 0.04–0.20 | 0.04–0.14 |
| Back-Up Slurry | | |
| "Nalcast" P-2 Fused Silica | 75–53.5 | 75–60 |
| Colloidal Silica Aquasol | 10–46.5 | 25–40 |
| Extra Water | 15–0 | None |
| pH | 9.6–9.9 | 9.6–9.9 |
| Viscosity, No. 4 Zahn Cup, Sec. | 12–25 | 15–19 |
| Colloidal Particle to Refractory Flour Ratio | 0.04–0.26 | 0.10–0.20 |

Adjustment of the slurries to a suitable working viscosity range is carried out by adding water or refractory flour as needed. In the more preferred ranges of colloidal particle to refractory flour ratios water or refractory flour additions are rarely needed in preparing the slurries, but for the lower ratios some additional water is generally required. Over the working life of the slurries frequent water additions are made to maintain proper consistency in order to compensate for water loss by evaporation.

The working viscosities are low initially and this enhances ready penetration of the slurries into recessed areas or blind cores of patterns providing proper filling with slurry and preventing air entrapment, sometimes obtained with high viscosity slurries.

The pH of the slurries as indicated in the Tables is measured with a Beckman Zeromatic II pH meter using a Beckman 39301 glass electrode and a Beckman 39402 Calomel reference electrode. The reported pH values are those of the slurries as mixed. These values are not critical and no significant pH change is observed in the working life of the slurries up to several weeks.

In the "Nalcast" fused silica slurries, both the prime coat and back-up coat viscosities are higher than those employed in the zircon-molochite system. However, these fused silica slurry viscosities are less than those normally used in the "Nalcast"-aqueous colloidal silica system. The lower viscosities aid in wetting out and uniformly building up recessed areas and blind cores on wax patterns.

Pattern Materials and Cleaning

Conventional wax and plastic expendable patterns of the object to be reproduced in metal are prepared. These patterns are then affixed to a sprue and runner system giving the usual cluster arrangement needed to produce them in multiple. The pattern assembly or cluster is cleaned with a suitable solvent such as methyl ethyl ketone, trichloroethylene or alcohol mixtures to remove soil and release agents used in their preparation. The solvent-cleaned assembly is dried and as such is ready for dipping in the prime coat slurry. If wettability of the slurry onto the pattern is a problem a 1 to 2% "Cab-O-Sil" M–5 (Cabot Corp.) solution in isopropanol provides a thin hydrophilic film which vastly improves wettability. This "Cab-O-Sil" coating, however, must be dried before dipping the pattern assembly into the slurry. "Cab-O-Sil" is a silica aerogel made by flame hydrolysis of silicon tetrachloride.

Although wax and plastics are the preferred expendable pattern materials others such as low-melting tin-bismuth alloys may be employed.

Dipping

In the shell building process a solvent-cleaned, expendable pattern assembly such as wax is first dipped into a bath comprising a colloidal silica sol or alkaline ionic silicate solution which may or may not contain a refractory grain. Where a very fine finish is desired on the metal casting this can be obtained by omitting the refractory grain from the prime coat. Ordinarily, however, the prime coat will be a slurry of refractory grain in the colloidal silica sol or alkaline ionic silicate solution. For most metal castings colloidal silica is preferably used rather than alkali metal silicate in at least the prime coat due to refractory problems created by the large amount of alkali in the silicates. For low melting alloys, such as aluminum, brasses and bronzes, however, alkali metal silicates can be used as the binder in the prime coat. Since silicates are less expensive than silica sols their use where possible will decrease cost without increasing shell construction time.

The pattern assembly is dipped and thoroughly wetted in the prime coat, withdrawn, drained, and rotated to insure complete coverage in recessed areas or in blind cores. Stuccoing and simultaneous setting of the silica or silicate is accomplished in the conventional manner by dipping the coated pattern into a fluidized bed of the stucco grain coated or mixed with setting agent or by sprinkling the stucco grain containing setting agent onto the surface of the coated pattern.

The stuccoed coatings are chemically set or immobilized by the setting agent. Generally 1 to 5 minutes is allowed to permit the setting agent to immobilize the silica or silicate before the pattern can be redipped. The time depends on the solubility of the setting agent compound in the silica or silicate dispersion.

After the prime coat is applied the coated pattern is dipped into the back-up coat slurry, and stuccoed with the setting agent-refractory stucco grain mixture. These steps are repeated until a coating of the desired thickness is obtained. Usually about 8 to 10 coats, including prime coat and back-up coats, are used. However, as little as a total of 4 coats or even less can be employed, or as much as 30 coats or more, depending upon wax pattern assembly, pattern size, and configuration. The large number of coats can find application in making shells for massive castings not usually made by the precision investment casting technique.

Drying

After the final coat is applied the shell assembly is ready for drying. Drying under ambient conditions for 18 to 24 hours is sufficient to drive off the bulk of the water enabling the assembly to be dewaxed without blistering or exhibiting cracks. Forced air drying at 110°F. for 5 hours is also sufficient to evaporate a comparable quantity of water and permit dewaxing of the shell without blistering or exhibiting cracks.

Dewaxing

Dewaxing of the shells may be carried out by the normal procedures available; i.e., flash furnace dewaxing at 1700°–1900°F., steam autoclave dewaxing and solvent vapor dissolving of the wax.

Flash dewaxing is carried out by placing the shell assembly in a furnace previously heated at 1700°–1900°F. At these temperatures the wax is heated and expands, exerting an internal pressure on the shell structure. This pressure is relieved by the wax melting and running out the pouring cup in the shell assembly and also to a lesser extent permeating into the pores of the structures. Shell assemblies dried under controlled humidity and temperature conditions as well as forced air dried at 100°F. for 5 hours as cited previously, do not exhibit cracks or blisters and are suitable for metal casting.

Steam autoclave dewaxing, like furnace flash dewaxing, also depends on rapid heating of the wax and melting of it to relieve the internal pressure on the shell assembly. As a consequence, after loading the shell assemblies in an autoclave, steam pressure is raised as quickly as possible to promote rapid heating of the wax. Shell assemblies dewaxed in a steam autoclave exhibit crack free and blister free surfaces suitable for metal casting.

Solvent vapor elimination of the wax in shell assemblies is carried out with trichloroethylene vapor. The solvent is boiled in a lower portion of a degreasing tank and the vapors penetrate the pores of the ceramic shell assembly and immediately dissolve the wax faces adjacent to the ceramic investment before the heat of the solvent vapors expands the wax. Subsequently the bulk of the wax pattern is melted, but only after the internal pressure on the shell structure is relieved. Shell assemblies in which the wax is removed by the solvent vapor technique exhibit crack free and blister free shells suitable for metal casting.

EXAMPLES

The following examples further illustrate the process and products of this invention. In the examples percentages and parts are by weight unless otherwise specified.

EXAMPLE 1

A shell mold suitable for precision casting of metals is prepared according to the method of this invention in the following manner.

A prime coat slurry is prepared by mixing 325 mesh zircon grain (No. 3 flour, Casting Supply House) with "Ludox" SM–30, an aqueous colloidal silica dispersion and stirring the mixture for 24 hours before use. The composition, having a binder solids-to-zircon ratio of 0.09 is:

| Prime Coat Slurry A | Parts by Weight |
| --- | --- |
| Zircon flour, 325 mesh | 77.0 |
| "Ludox" SM–30 (30% $SiO_2$) | 23.0 |

In the same manner a back-up coat slurry is prepared by mixing 200 mesh molochite grain (No. 6 flour, Casting Supply House) with "Ludox" SM–30 and stirring for 24 hours before use. The composition, having a binder solids-to-molochite ratio of 0.16, is:

| Back-Up Coat Slurry B | Parts by Weight |
| --- | --- |
| Molochite flour, 200 mesh | 64.5 |
| "Ludox" SM–30 (30% $SiO_2$) | 35.5 |

A wax pattern is cleaned in methyl ethyl ketone, air dried and dipped into a 1% solution of "Cab-O-Sil" M–5 in isopropyl alcohol and air dried to make the surface wettable by the basid "Ludox" prime coat A. The pattern is then dipped into prime coat Slurry A until thoroughly wetted, withdrawn and drained of excess slurry and, while still wet, inserted into a fluidized bed containing zircon stucco grain (No. 1 zircon, −80 to +140 mesh, Casting Supply House) coated with 10% of its weight of PEI–18, polyethylenimine (Dow Chemical Co.) as its hydrochloride salt.

Similarly, without drying, the pattern is given a back-up coat of Slurry B and stuccoed with molochite grain (−30 to +60 mesh, Casting Supply House) coated with the same weight percent of the same polymer salt in a fluidized bed.

This sequence is repeated six times with back-up coat Slurry B to give a mold approximately three-eighth inch thick within 20 minutes. At no point is sloughing of a coating seen. The two slurries used in this procedure remain stable.

After air drying under ambient conditions for 24 hours the wax is removed from the mold by heating the coated pattern in a melt-out furnace at 1700° to 1800°F. for 2-3 minutes. The shell is heated an additional 15-20 minutes to ensure complete removal of carbon.

The mold is free of cracks and other defects and is suitable for metal casting.

Subsequently, AMS 5382 high-temperature alloy (25% Cr, 10% Ni, 8% W and the emainder Co, nominal analysis) is poured into the mold to give a sound casting.

EXAMPLE 2

Example 1 is repeated substituting 15% "Catalin" Resin 306, a urea-formaldehyde-amine resin (Catalin Corp.) for the polyethylenimine salt of Example 1.

EXAMPLE 3

Example 1 is repeated substituting 5% "Reten" 205M cationic polymer (Hercules Chemical Co.) for the polyethylenimine salt of Example 1.

EXAMPLE 4

Example 1 is repeated substituting "Ludox" HS–30 colloidal silica dispersion with an average particle size of about 15 m$\mu$ for "Ludox" SM-30 in Prime Coat Slurry A and Back-Up Coat Slurry B. A good mold similar to that obtained in Example 1 is produced.

EXAMPLE 5

Example 1 is repeated substituting "Ludox" AS, an ammonium stabilized colloidal silica aquasol containing 30% $SiO_2$, for "Ludox" SM-30 in Prime Coat Slurry A and Back-Up Coat Slurry B. A good mold similar to that obtained in Example 1 is produced.

EXAMPLE 6

Example 1 is repeated substituting "Ludox" AM, an alumina modified silica aquasol containing 30% $SiO_2$, for "Ludox" SM-30 in Prime Coat Slurry A and Back-Up Coat Slurry B. A good mold similar to that obtained in Example 1 is produced.

EXAMPLE 7

A shell mold is prepared according to the method of this invention in a manner similar to that employed in Example 1.

The zircon prime coat slurry made with "Ludox" SM-30, designated A in Example 1, is used in constructing the mold.

In the manner of Example 1 a back-up coat slurry is prepared. The proportion of ingredients if formulated to give a binder solids-to-refractory grain ratio of 0.30. This is designated back-up coat Slurry C:

| Back-Up Coat Slurry C | Parts by Weight |
|---|---|
| Molochite flour, 200 mesh | 50.0 |
| "Ludox" SM-30 (30% $SiO_2$) | 50.0 |

A shell mold is built up on a wax pattern as described in Example 1 using zircon and molochite stucco grains coated with 7.5% of their weights of hexadecyltrimethylammonium chloride to set prime and back-up coatings. Complete fabrication of the shell requires only 15 minutes. The air dried and fired mold is free of cracks and other defects and suitable for casting of metal.

EXAMPLES 8 to 10

Example 7 is repeated substituting the listed quaternary ammonium salts in the amounts shown for the hexadecyltrimethylammonium chloride of Example 7.

| Example | Quaternary Salt | % of Grain Wt. |
|---|---|---|
| 8 | Didodecyldimethylammonium acetate | 10 |
| 9 | Octadecenyltrimethylammonium phosphate | 7.5 |
| 10 | Tetradecylpyridinium chloride | 12.5 |

EXAMPLES 11 - 13

Example 7 is repeated substituting the listed amine salts in the amounts shown for the hexadecyltrimethylammonium chloride of Example 1.

| Example | Amine Salt | % of Grain Wt. |
|---|---|---|
| 11 | Dodecylamine hydrochloride | 5 |
| 12 | Dioctylamine hydrosulfate | 3.0 |
| 13 | Dimethyldecylamine acetate | 10 |

EXAMPLE 14

A shell mold is prepared according to the method of this invention in a manner similar to that described in Example 1.

One slurry is used in this example. It is designated Slurry D and is prepared by mixing 200 mesh "Nalcast" P1W fused silica flour (Nalco Chemical Co.) with "Ludox" SM–30 and stirring for 48 hours before use. Binder solids-to-refractory grain weight ratio is 0.10.

| Slurry D | Parts by Weight |
|---|---|
| "Nalcast" P1W fused silica, 200 mesh | 68.7 |
| "Ludox" SM-30 (30% $SiO_2$) | 22.9 |
| Water | 8.4 |

A shell mold is formed on a clean wax pattern in the manner described in Example 1, except in this case one slurry serves for both prime and back-up coats:

Initially, a prime coat of Slurry D is applied and stuccoed with "Nalcast" S–1 fused silica (Nalco Chemical Co.) mixed with 10% of its weight of solid "Chlorohydrol" basic aluminum chloride (Reheis Co.) sieved to 48 to 100 mesh.

Six back-up coats of Slurry D stuccoed with coarser "Nalcast" S–2 fused silica (Nalco Chemical Co.) mixed with the same percentage of aluminum salt are applied in the same way.

Complete fabrication of the shell mold requires 30 minutes. The air dried and fired mold is free of cracks and other defects and is satisfactory for casting of metal.

EXAMPLE 15

Example 14 is repeated substituting 15% solid "Niaproof" basic aluminum acetate, $Al(OH)_2 \cdot O_2C-CH_3$ ⅓ $H_3BO_3$, for the basic aluminum chloride of Example 14.

EXAMPLE 16

A shell mold is prepared according to the method of this invention in a manner similar to that described in Example 1.

The zircon prime coat slurry made with "Ludox" SM–30, designated A in Example 1, is used in constructing the mold in this example.

In addition, a back-up slurry is prepared by mixing 200 mesh molochite grain with a solution of F Grade Sodium Silicate (Du Pont Co.) containing 15% $SiO_2$ and stirring for 24 hours before use. This composition, designated back-up coat Slurry E, has a binder solids ($SiO_2$)-to-molochite weight ratio of 0.075.

| Back-Up Coat Slurry E | Parts by Weight |
| --- | --- |
| Molochite flour, 200 mesh | 66.7 |
| "F" Grade Sodium Silicate Solution (15% $SiO_2$) | 33.3 |

A wax pattern is given a dip coating of Slurry A and stuccoed with No. 1 zircon grain mixed with 12% of its weight of solid basic aluminum hydroxyacetate sieved to 48–100 mesh. Six back-up coats of Slurry E stuccoed with −30 to +60 mesh molichite grain then are applied and chemically set as described.

Formation of the mold requires 20 minutes. The air dried and fired mold has no cracks or other defects and is suitable for casting metals.

EXAMPLE 17

A shell mold is prepared as in Example 16 except Lithium Polysilicate 48 (20% $SiO_2$, Du Pont Co.) is used in place of sodium silicate in the back-up coat slurry.

The air dried and fired mold is free of cracks and other defects and is suitable for casting metals.

EXAMPLE 18

A shell mold is prepared as in Example 16 except No. 30 Potassium Silicate (20.8% $SiO_2$, Du Pont Co.) is used in place of sodium silicate in the back-up coat slurry.

The air dried and fired mold is crack free and gives a metal casting with excellent surface definition.

Although the invention has been described with particular reference to its preferred use in making expendable, ceramic shell molds for precision investment casting of metals, it obviously can be adapted to many other useful purposes. In general it can be used in any case where it is desired to provide a high temperature-resistant, heatinsulating layer on the surfaces of an object such as an automobile muffler or manifold. For this purpose the slurry of negative sol or silicate can include any desired refractory insulating material such as expanded perlite or asbestos fibers. Also the process can be used to provide high temperature-resistant ceramic coatings which are heat conductive by including a particulate refractory metal in the slurries. Since the slurries can be of low viscosity the process can be adapted to the manufacture of a variety of intricate ceramic shapes on either disposable or permanent cores.

It is frequently desirable to include in the dip both a fibrous reinforcing agent to improve the properties of the resulting shell molds and other laminate articles. For example, significant increases in the green and fired strengths of investment casting molds made by the process of the invention can be attained by including in the negative sol or silicate both a small amount of wollastonite (calcium metasilicate) mineral fibers, Kaowool volcanic rock fibers, Fiberfrax alumino-silicate fibers, asbestos fibers, or glass fibers.

I claim:

1. A rapid process for forming a refractory laminate on the surface of a support structure which comprises:
   a. dipping the surface in a bath comprising at least one member of the group consisting of a sol of negatively charged colloidal particles selected from the group consisting of silica, bentonite, attapulgite and kaolinite and a solution of an alkaline ionic silicate to form a layer on the surface,
   b. contacting the layer on the surface with refractory stucco grains containing a setting agent to firmly set the layer, the setting agent being selected from the group consisting of monofunctional cationic organic compounds having at least one and no more than two alkyl chains of from 6 to 25 carbon atoms, polycationic organic monomers having from 1 to 24 carbon atoms per functional group, polycationic organic polymers having from 1 to 24 carbon atoms per functional group, positively charged colloidal particles selected from the group consisting of alumina and a silica core coated with a metal-oxygen compound and basic aluminum salts having the general formula $$Al_x(OH)_yA_z$$

wherein $x = 1 - 8$, $y = 1 - 20$, $z = 1 - 4$ and A is an acid anion,
   c. repeating steps (a) and (b) in sequence as required to build a refractory laminate of the desired thickness.

2. Process of claim 1 wherein the bath of step (a) is a slurry of particulate refractory material in a sol of negatively charged colloidal silica particles.

3. A rapid process for forming expendable, refractory shell molds for precision investment casting of metals comprising:
   a. dipping a disposable pattern of the metal casting in a bath comprising at least one member of the group consisting of a sol of negatively charged colloidal particles selected from the group consisting of silica, bentonite, attapulgite and kaolinite; and a basic solution of alkaline ionic silicate to form a layer on the pattern,
   b. contacting the layer on the surface with refractory stucco grains containing a setting agent to firmly set the layer, the setting agent being selected from the group consisting of monofunctional cationic organic compounds having at least one and no more than two alkyl chains of from 6 to 25 carbon atoms, polycationic organic monomers having from 1 to 24 carbon atoms per functional group, polycationic organic polymers having from 1 to 24 carbon atoms per functional group, positively charged colloidal particles selected from the group consisting of alumina and a silica core coated with a metal-oxygen compound and basic aluminum salts having the general formula $$Al_x(OH)_yA_z$$

wherein $x = 1 - 8$, $y = 1 - 20$, $z = 1 - 4$ and A is an acid anion,
   c. repeating steps (a) and (b) in sequence as required to build a refractory shell mold of the desired thickness.

4. Process of claim 3 wherein the bath of step (a) is a slurry of refractory grain in a sol of negatively charged colloidal silica particles.

5. Process of claim 3 wherein in step (b) the layer on the pattern is contacted with a fluidized bed of refractory stucco grains coated with a setting agent.

6. Process of claim 4 wherein two slurries of refractory grain in a sol of negatively charged silica particles are used, the first slurry containing relatively fine refractory grain and being used for the prime coat, and the second slurry containing relatively coarse refractory grain and being used for subsequent coats.

7. Process of claim 6 wherein the setting agent is selected from the group consisting of monofunctional cationic organic compounds having at least one but no more than two alkyl chains of 8 to 20 carbon atoms, polycationic organic monomers having from one to 10 carbon atoms per functional group, polycationic organic polymers having from one to 10 carbon atoms per functional group, and basic aluminum salts having the formula $$Al_x(OH)_y A_z$$

wherein $x = 1-2$, $y = 1 - 5$, $z = 1 - 2$ and A is an acid anion.

8. The process of claim 6 wherein the setting agent is a member of the group consisting of basic aluminum chloride, basic aluminum formate and basic aluminum acetate.

9. The process of claim 6 wherein the refractory stucco grain is coated with from 1 to 30% by weight with setting agent.

10. The process of claim 6 wherein the refractory stucco grain is coated with from 3 to 15% by weight with setting agent.

* * * * *